United States Patent [19]

Yanagisawa et al.

[11] 3,750,540

[45] Aug. 7, 1973

[54] ELECTRIC EXPOSURE CONTROL DEVICE

[75] Inventors: Takeshi Yanagisawa, Kanagawa-ken; Kinzi Tanikoshi; Yusuke Ono, both of Tokyo, all of Japan

[73] Assignee: Canon Kabushiki Kaisha, Ohta-Ku, Tokyo, Japan

[22] Filed: June 9, 1970

[21] Appl. No.: 44,670

[30] Foreign Application Priority Data

| | | |
|---|---|---|
| June 13, 1969 | Japan | 44/46555 |
| Nov. 18, 1969 | Japan | 44/92428 |
| Dec. 1, 1969 | Japan | 44/96421 |
| Dec. 19, 1969 | Japan | 44/102718 |
| Jan. 12, 1970 | Japan | 45/3407 |
| July 21, 1969 | Japan | 44/67685 (utility model) |
| July 21, 1969 | Japan | 44/69121 (utility model) |
| Nov. 18, 1969 | Japan | 44/109639 (utility model) |
| Nov. 18, 1969 | Japan | 44/109640 (utility model) |
| Nov. 18, 1969 | Japan | 44/109641 (utility model) |
| Dec. 19, 1969 | Japan | 44/121098 (utility model) |
| Feb. 13, 1970 | Japan | 45/14046 (utility model) |

[52] U.S. Cl. .......... 95/10 CT

[51] Int. Cl. .......... G03b 7/08

[58] Field of Search .......... 95/10 CT

[56] References Cited

UNITED STATES PATENTS

| | | | |
|---|---|---|---|
| 3,426,357 | 2/1969 | Pauhes | 95/10 UX |
| 3,602,717 | 8/1971 | Konig | 95/10 X |
| 3,641,890 | 2/1972 | Ono | 95/10 |
| 3,460,450 | 8/1969 | Ogihara | 95/10 |
| 3,555,984 | 1/1971 | Rentschler | 95/10 |
| 3,245,332 | 4/1966 | Kagan | 95/10 X |
| 3,205,803 | 9/1965 | Burgarella et al. | 95/10 X |
| 3,562,600 | 2/1971 | Koenig | 95/10 X |
| 3,551,059 | 12/1970 | Kitai | 95/10 X |
| 3,533,348 | 10/1970 | Yanagi | 95/10 |
| 3,470,798 | 10/1969 | Miyakawa | 95/10 C |

*Primary Examiner*—Samuel S. Matthews
*Assistant Examiner*—Michael L. Gellner
*Attorney*—McGlew and Toren

[57] ABSTRACT

In the exposure control device disclosed, a photosensitive element varies its resistance in response to the ambient light, and forms a voltage divider with a logarithmic compression diode. A capacitor senses the voltage across the diode and stores that voltage. A differential amplifier senses the stored voltage and varies the current through a transistor. The latter controls the current through a second compression diode, identical with the first, and connected across the other input of the differential amplifier so that the voltage across the other input equals the capacitor voltage. The transistor current then equals the current through the photosensitive elements. A network uses this current value to charge a control capacitor when a camera shutter is opened. Charging takes place at a rate determined by the photosensitive element. A shutter actuator senses when the charge across the control capacitor reaches a given level, and closes the shutter.

33 Claims, 31 Drawing Figures

INVENTOR
TAKESHI YANAGISAWA
KINZI TANIKOSHI
YUSUKE ONO
BY McGlew & Toren
ATTORNEY INVENTOR
TAKESHI YANAGISAWA
KINZI TANIKOSHI
YUSUKE ONO
BY McGlew & Toren
ATTORNEY INVENTOR
TAKESHI YANAGISAWA
KINZI TANAKOSHI
YUSUKE ONO
BY McGlew & Toren
ATTORNEY INVENTOR
TAKESHI YANAGISAWA
KINZI TANIKOSHI
YUSUKE ONO
BY McGlew & Toren
ATTORNEY INVENTOR
TAKESHI YANAGISAWA
KINZI TANIKOSHI
YUSUKE ONO
BY McGlew & Toren
ATTORNEY INVENTOR
TAKESHI YANAGISAWA
KINZI TANIKOSHI
YUSUKE ONO
BY McGlew & Toren
ATTORNEY INVENTOR
TAKESHI YANAGISAWA
KINZI TANIKOSHI
YUSUKE ONO
BY McGlew & Toren
ATTORNEY

INVENTOR
TAKESHI YANAGISAWA
KINZI TANIKOSHI
YUSUKE ONO

BY

ATTORNEY

PATENTED AUG 7 1973

3,750,540

INVENTOR
TAKESHI YANAGISAWA
KINZI TANIKOSHI
YUSUKE ONO
BY McGlew & Toren
ATTORNEY INVENTOR
TAKESHI YANAGISAWA
KINZI TANIKOSHI
YUSUKE ONO
BY Mc Glew & Toren
ATTORNEY INVENTOR
TAKESHI YANAGISAWA
KINZI TANIKOSHI
YUSUKE ONO
BY McGlew & Toren
ATTORNEY INVENTOR.
TAKESHI YANAGISAWA
KINZI TANIKOSHI
BY YUSUKE ONO
McGlew & Toren
ATTORNEY

INVENTOR
TAKESHI YANAGISAWA
KINZI TANI KOSHI
YUSUKE ONO

BY McGlew & Toren

ATTORNEY

INVENTOR
TAKESHI YANAGISAWA
KINZI TANIKOSHI
YUSUKE ONO
BY McGlew & Toren
ATTORNEY INVENTOR
TAKESHI YANAGISAWA
KINZI TANIKOSHI
YUSUKE ONO
BY Mc Glew & Toren
ATTORNEY INVENTOR.
TAKESHI YANAGISAWA
KINZI TANIKOSHI
YUSUKE ONO
McGlew & Toren
ATTORNEY

ELECTRIC EXPOSURE CONTROL DEVICE

The present invention relates to an electric exposure control device for cameras, and more particularly to an electrical exposure control device with a memory capacitor for use in a single lens reflex camera of through-the-lens-sensing (TTL) type in which the light from an object being photographed is measured through the objective lens system.

In a single lens reflex camera of TTL type, the photoconductor element for photometry is often located within the optical system of a cemera finder, and the path of light thereto is blocked upon taking pictures because of the reflector mirror which bounces up. For this reason, a conventional electrical exposure control device is ineffective to control the shutter speed, and some means is required to store the resistance value that the photoconductor, such as of the type, CdS exhibits in response to the amount of incident light immediately before the actuation of the shtter. Various electrical shutters have been proposed which are provided with a memory of this kind. With these devices of the prior arts, it is difficult to provide a storage of the brightness of an object being photographed which varies over a broad range and to regenerate the stored value correctly in order to control the shutter speed. As a result, many of them have had drawbacks for use as a shutter of a single lens reflex camera of TTL type. The present invention has overcome the drawbacks of the conventional devices and provides an electric exposure control device comprising a photometric circuit having a photo-sensitive element such as a photoconductor photo-voltaic cell and a photo-diode an amplifier circuit, a regenerator circuit, and a controller circuit, said photometric circuit giving said amplifier circuit an output responsive to the light incident to the photo-sensitive element, said regenerator circuit receiving an output from said amplifier circuit and applying the output to both said controller circuit and said amplifier circuit, whereby said controller circuit controlling the exposure. The main feature of the present invention lies in that the photometric circuit comprises its output through a diode and that the photometric circuit is controlled by the output of the regenerator circuit to widen the range of an exposure value and assure a higher accuracy of exposure control.

The electric exposure control device according to the present invention is suitable for singel lens reflex camera of TTL type as mentioned above to provide a control of the shutter speed with an extremely high accuracy and over a broad range. At this end, a diode having a logarithmic characteristics (log-diode) is used in the photometric circuit to compress the variation of resistance of the photoconductor over a broad range, and the voltage across the diode is stored in a memory capacitor. In order to insure that the stored voltage of the capacitor remains unchanged upon interruption of the incident light upon the photoconductor when the reflector mirror bounces up, the voltage is detected by a transistor having a high input impedance, as for example a field effect transistor of metal oxide (MOS-FET). A differential amplifier circuit and a feedback circuit incorporating transistors are used to regenerate a resistance of a value responsive to the previously measured resistance value of the photoconductor, and which is employed as a resistor element of a time constant circuit that controls the shutter speed.

The present invention will be described below with reference to the drawings.

Figures 5A, 5B, 5C:
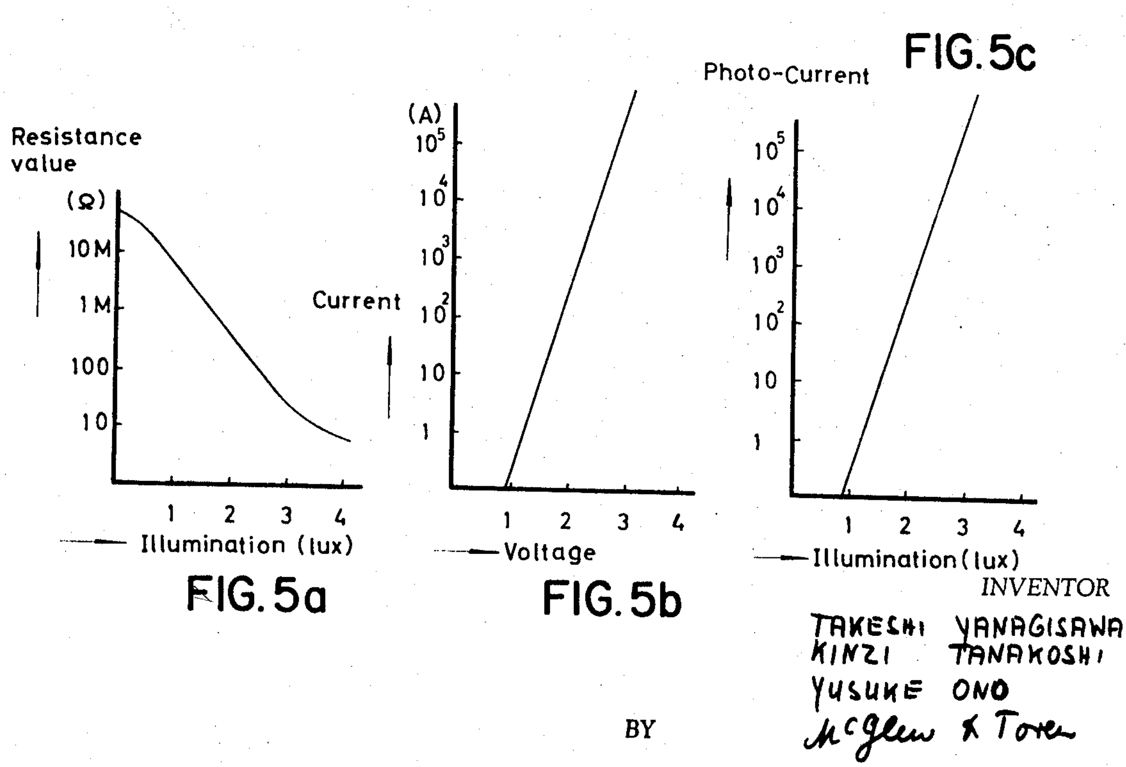

FIGS. 5 (*a*)(*b*) and (*c*) show respectively characteristics of a photoconductor, characteristics of a log-diode as a compressor, and characteristics of a photo-diode as a photo-sensitive element.

Figure 6:
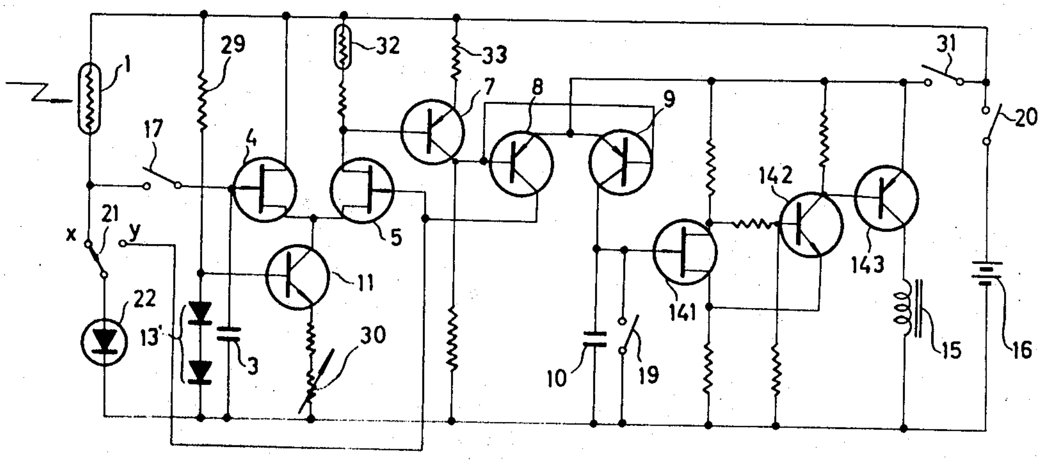

FIG. 6 is a circuit diagram showing an embodiment of the present invention with an improvement in thermal characteristics and stability against voltage changes.

Figure 7:
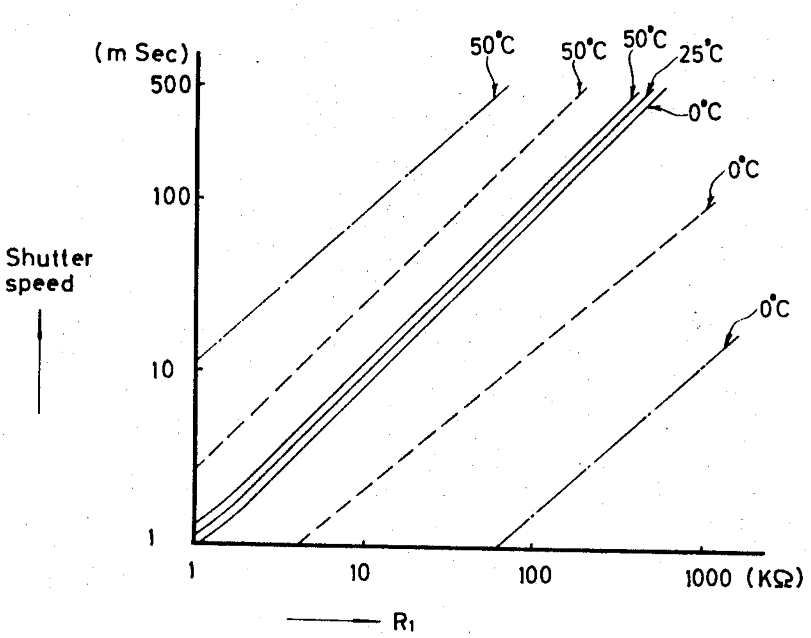
Figure 8:
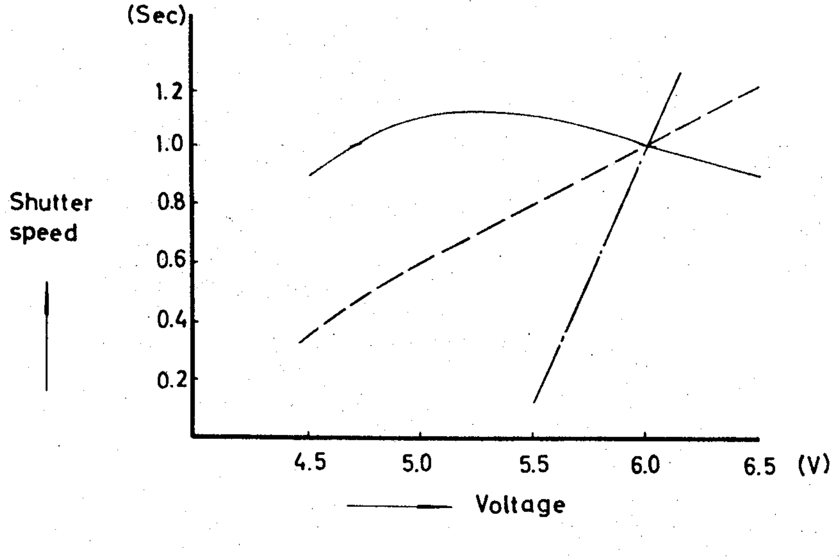

FIGS. 7 and 8 show respectively the improvement in thermal characteristics and the improvement in stability against voltage changes attained by the circuit shown in FIG. 6.

Figure 9:
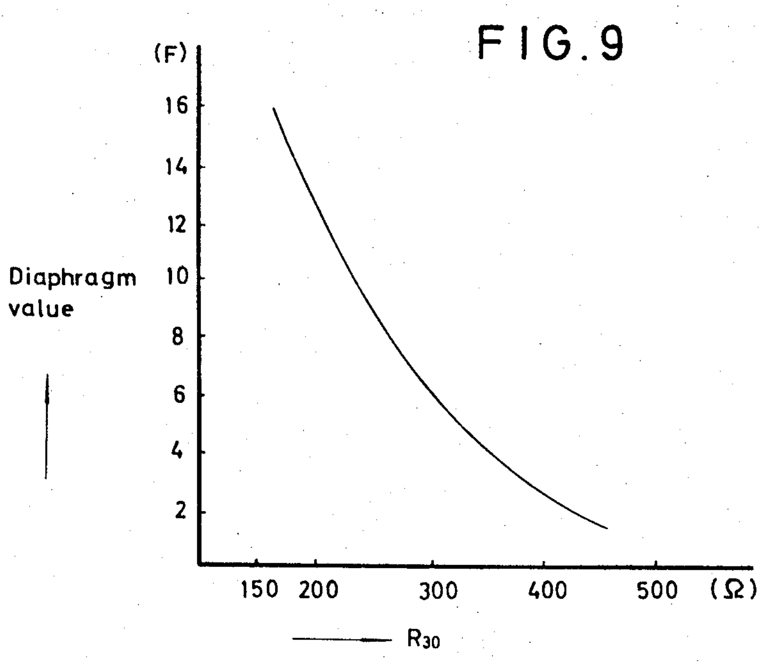

FIG. 9 is a graph showing characteristics of one resistor element for setting a photographic information.

Figure 10:
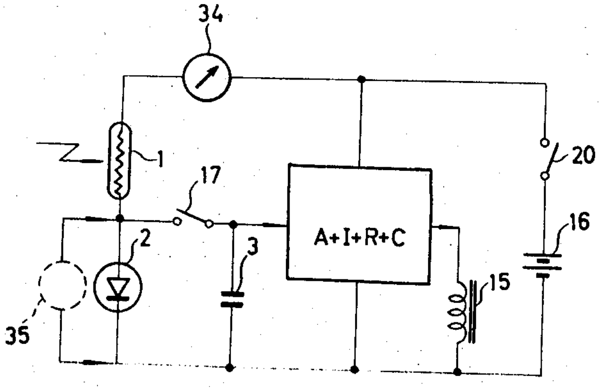
Figure 11:
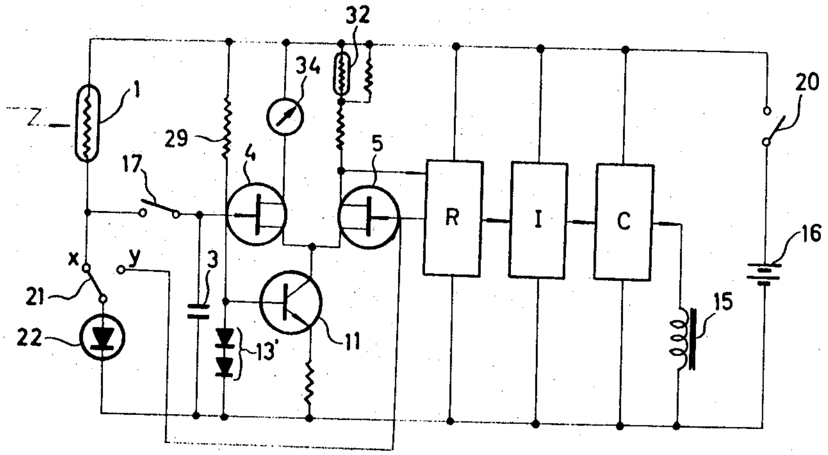
Figure 12:
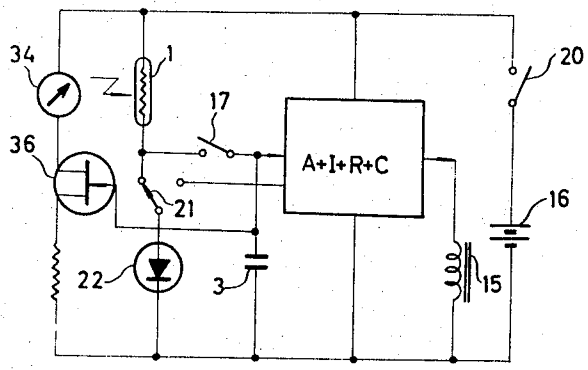

FIGS. 10, 11 and 12 are circuit diagrams according to the present invention, having respectively a meter for exposure indication.

Figure 13:
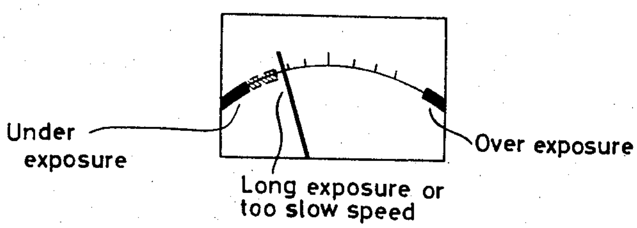

FIG. 13 is a schematic view of a indicator window.

Figure 14:
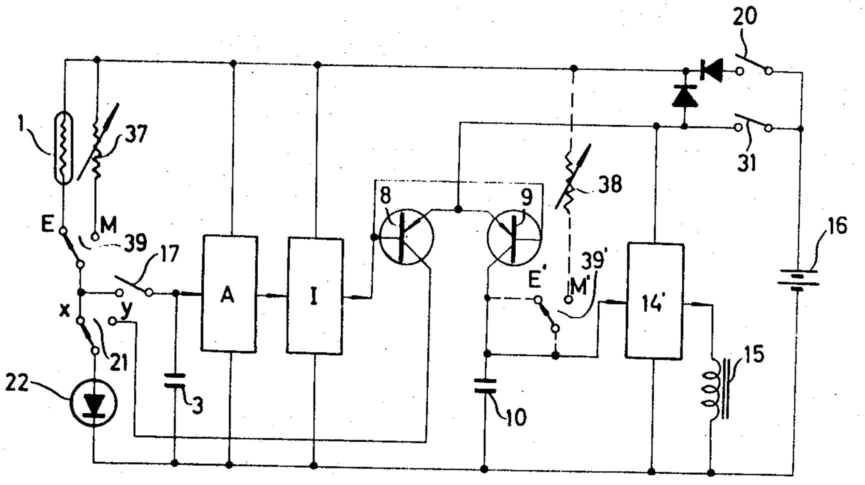
Figure 15:
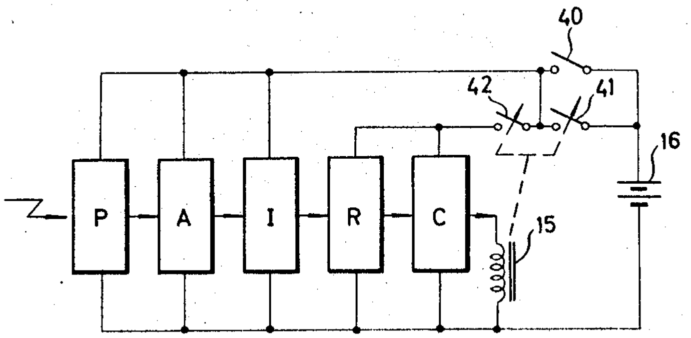
Figure 16:
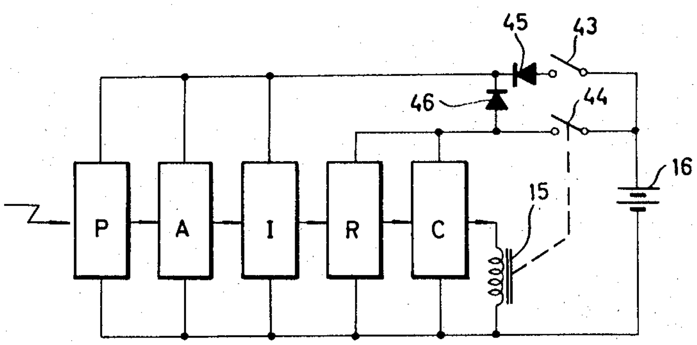

FIGS. 14, 15 and 16 are respectively a circuit diagram of a still another embodiment of the present invention.

Figure 17:
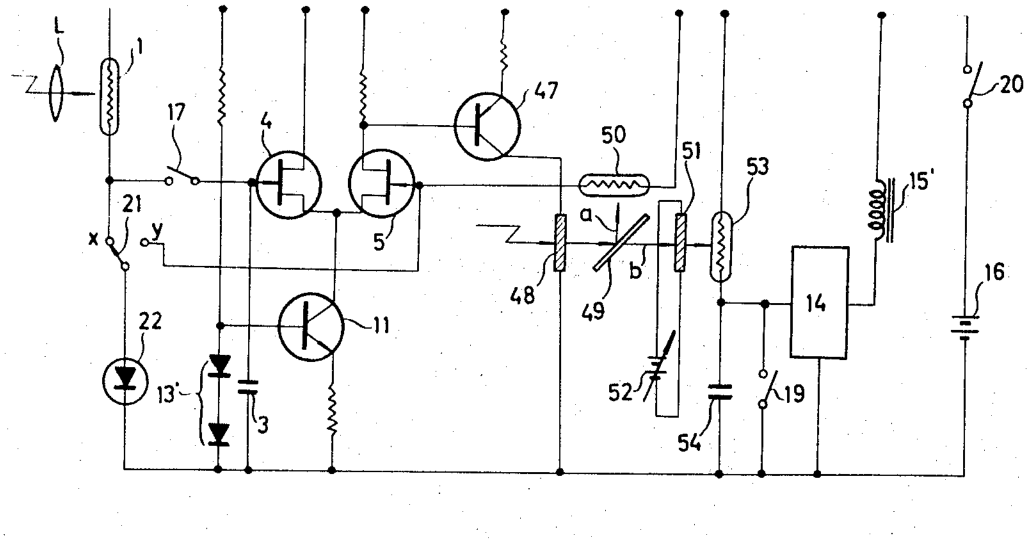

FIG. 17 is a circuit diagram showing a modification of the present invention.

Figure 18:
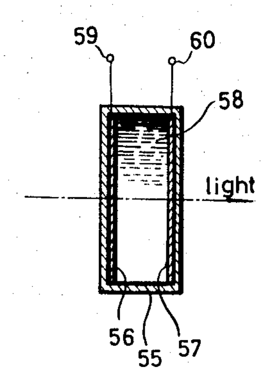

FIG. 18 shows a variable element used in the modification shown in FIG. 17.

Figure 19:
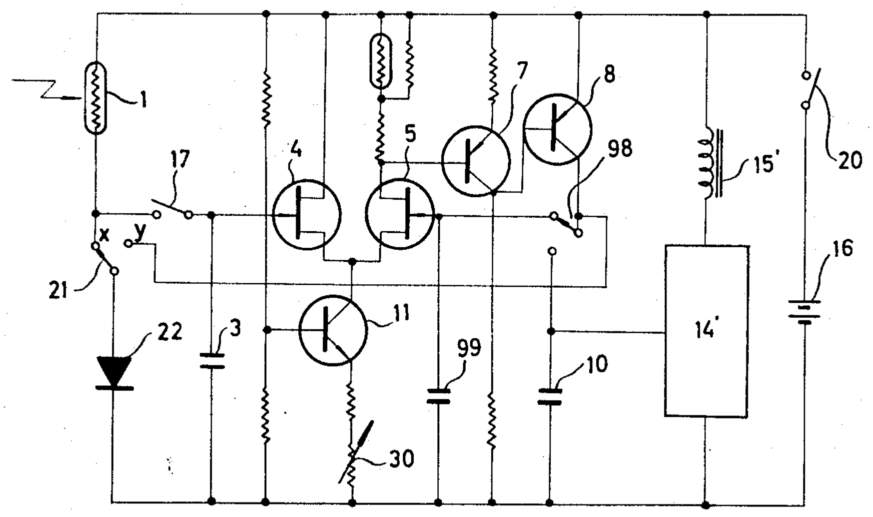
Figure 20:
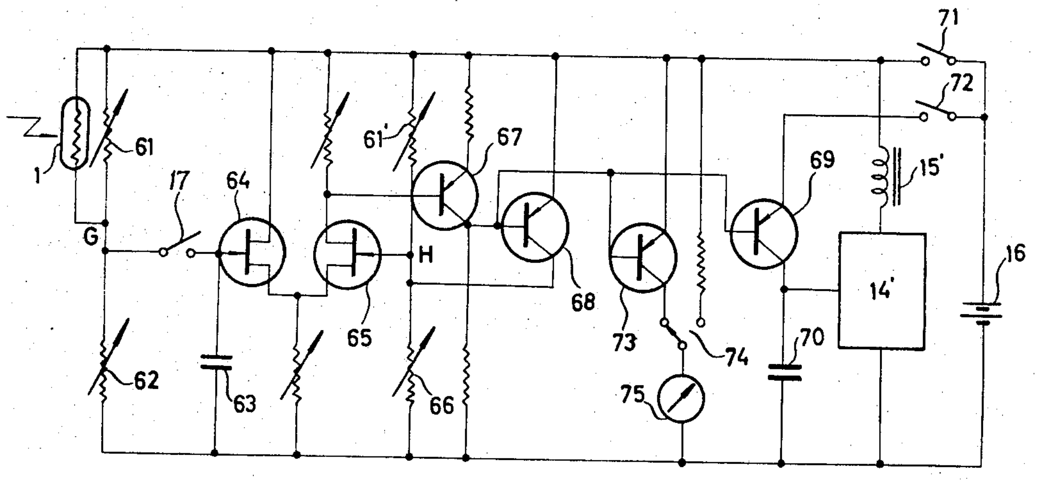
Figure 21:
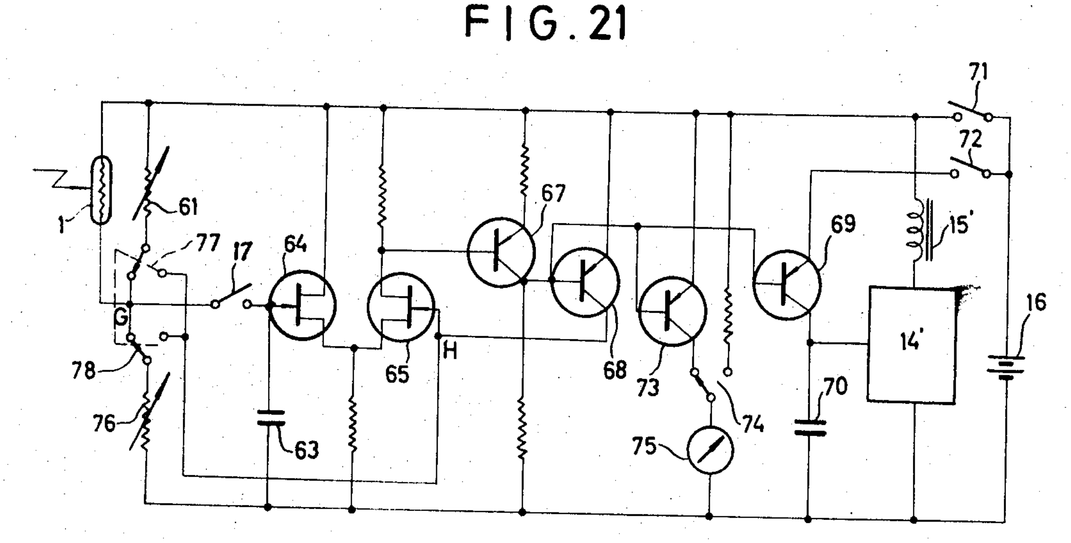

FIGS. 19, 20 and 21 are circuit diagrams showing another modification of the present invention.

Figure 22:
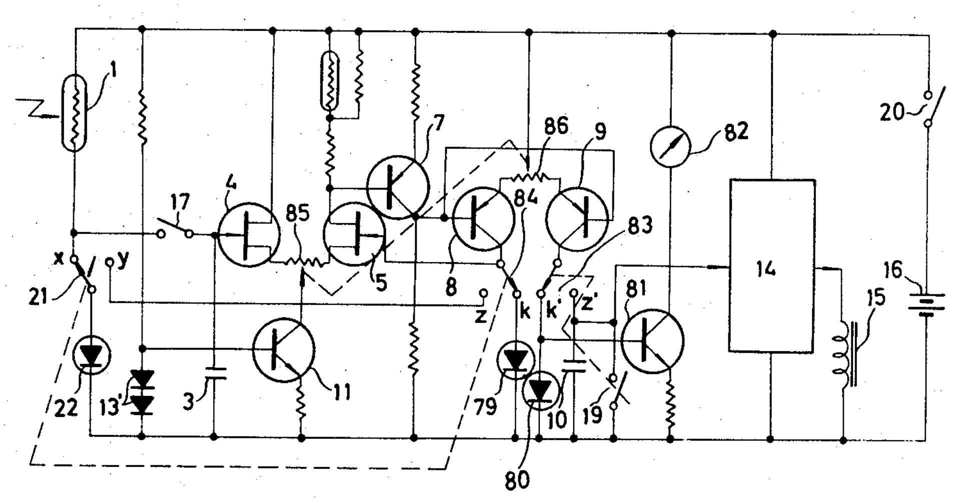

FIG. 22 is a circuit diagram of an embodiment of the present invention with improvement in setting means of a photographing information.

Figure 23:
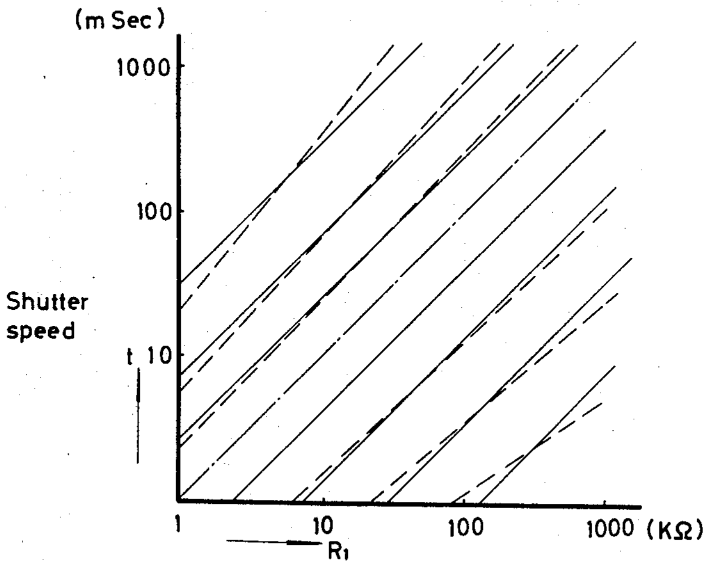

FIG. 23 shows the improvement attained by the embodiment shown in FIG. 22.

Figure 24:
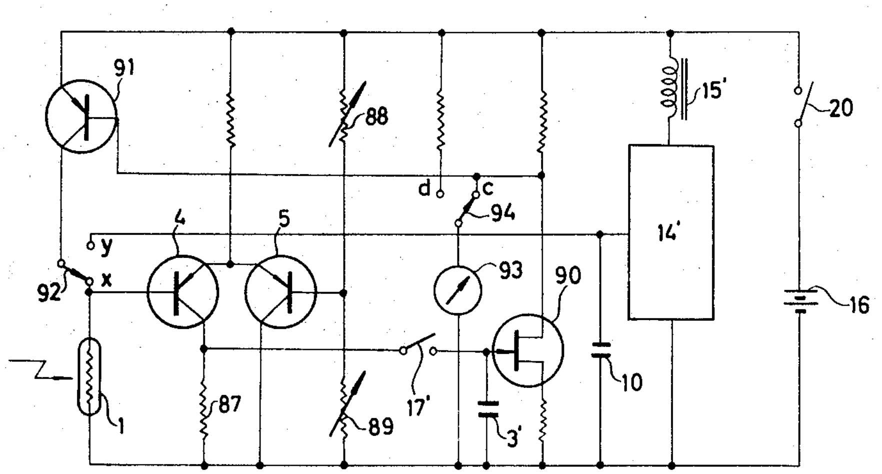
Figure 25:
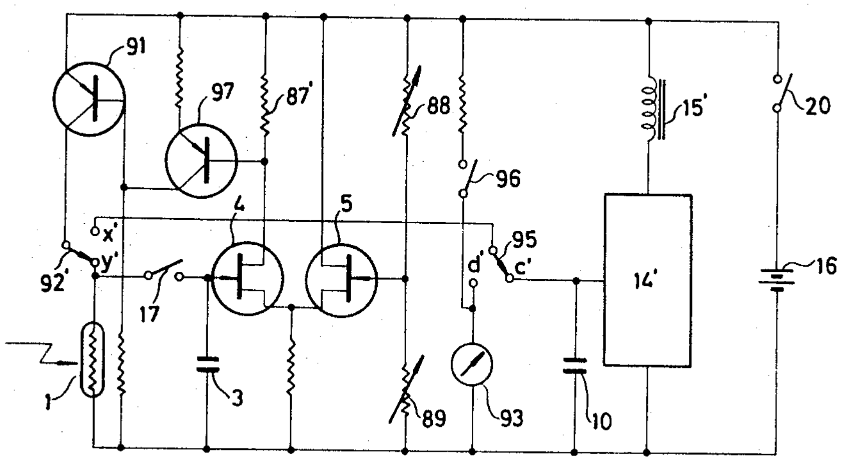

FIGS. 24 and 25 are circuit diagrams showing a still further modification of the present invention.

Figure 26:
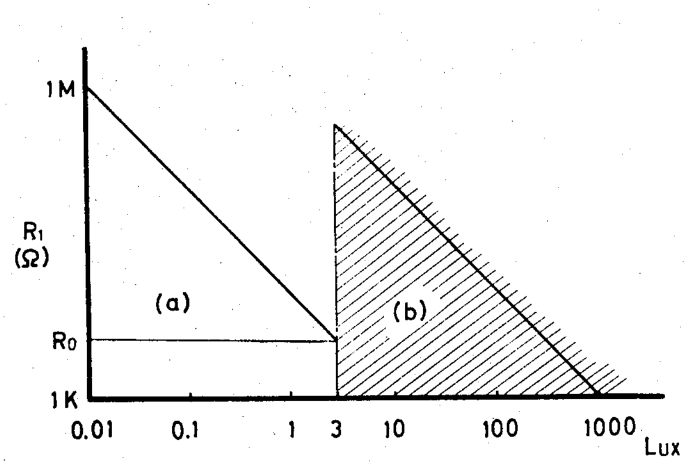

FIG. 26 is a graph showing resistance variation of the photoconductor to the light incident to the phtotconductor boty in cases a filter is used and no filter is used.

Figure 27:
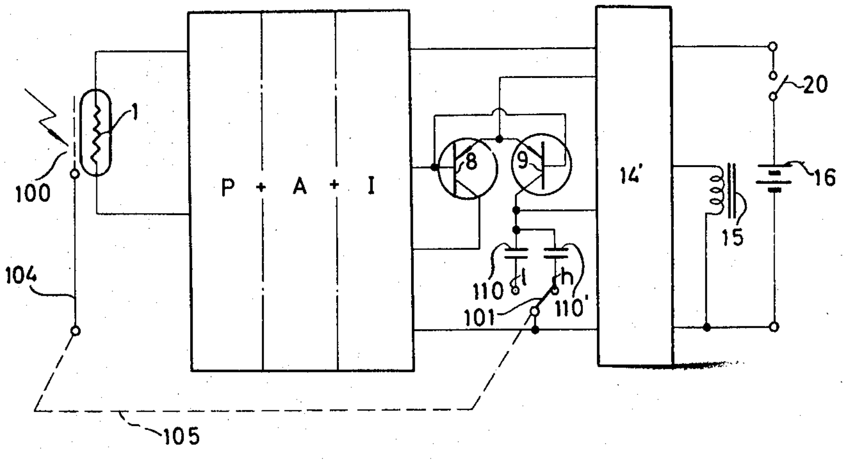

FIG. 27 is a circuit diagram of one embodiment of the present invention in which a change-over means is provided for widening the operational range of the device.

Figure 28:
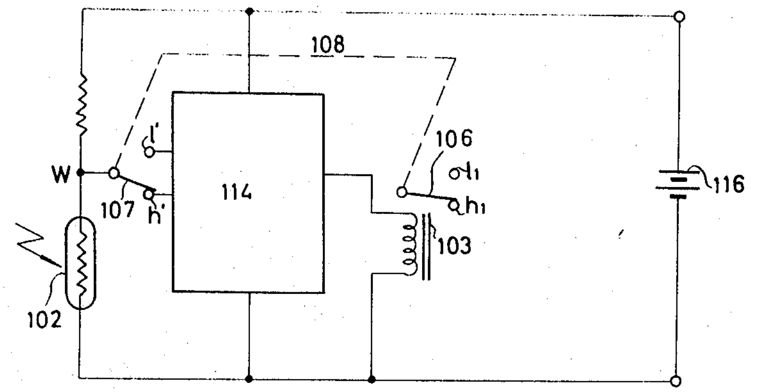

FIG. 28 is a circuit diagram of an automatic change-over means used for the circuit shown in FIG. 27.

Figure 29:
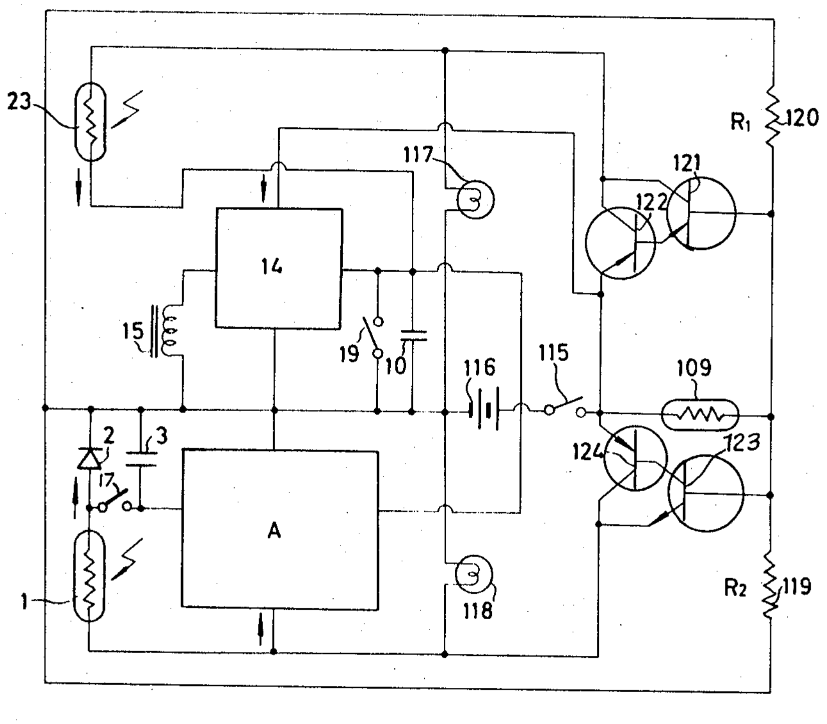

FIG. 29 is a circuit diagram of one embodiment of the present invention in which the change-over of a through-the-lens sensing photometry and a through-o-window sensing photometry is effected automatically.

Figure 1:
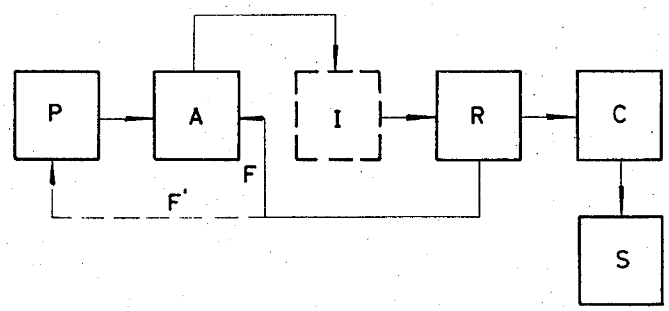
FIG. 1 is a schematic diagram showing a construction of th electric exposure control device according to the present invention.

In FIG. 1, the reference character P denotes a photometric circuit, A denotes an amplifier circuit, particularly a differential amplifier circuit for thermal stability, I denotes an inverter circuit (not always necessary), R denotes a regenerator circuit, C denotes a controller circuit, S denotes a device for exposure control, and F denotes a feed-back connection. The output from the photometric circuit P is applied to the amplifier circuit A and the output from the amplifier circuit A is applied to the regenerator circuit R, if necessary through the inverter circuit I. The output from the regenerator circuit R controls the controller circuit C and the amplifier circuit A through the feed-back connection F. The output from the regenerator circuit R may be applied to the amplifier circuit through the feed-back connection F' and the photometric circuit P. The controller circuit C controls the exposure control device C.

In FIG. 1, reference character 1 denotes a photoconductor element (for example, of CdS) which receives light from an object being photographed through an objective lens system and a reflector mirror. Reference character 2 denotes a diode having logarithmic characteristics (log-diode), 3 a memory capacitor, 4 and 5 field effect transistors (for example, MOS-FET) forming a differential amplifier, 6 a log-diode in a regenerator circuit and having the same characteristics as the diode 2. Reference characters 7 and 8 indicate transistors forming a feedback path of the regenerator circuit, 9 a transistor operating as a resistor element in a shutter speed controlling timer circuit, 10 a timer capacitor of the timer circuit, 11 a transistor for stabilizing the constant current supplied to the differential amplifier circuit, 12 and 13 diodes provided for circuit stabilization, 14 a trigger amplifier which comprises, for exampple, a Schmitt trigger circuit, 15 an electromagnet operative to actuate a shutter closure in response to an output from the trigger circuit, 16 a power supply battery, and 17 to 20 switches.

The circuit of FIG. 2 operates as follows: Light from an object being photographed passes through an objective lens system and a reflector mirror, not shown, to impinge upon the photo-conductor element 1 disposed within the optical system of the finder, thereby varying the resistance thereof. Assume now that power supply switch 20 is closed and switch 17 is also closed while switch 18 remains open, then a current $I_1$ flows from the battery 16 through the photo-conductor 1, the log-diode 2 and the diode 13 to produce a voltage across the log-diode 2 which corresponds to the resistance of the photo-conductor. This voltage $E_1$ charges the memory capacitor 3, which produces the voltage of $E_1$ thereacross. The voltage $E_1$ corresponds to the resistance of the photo-conductor 1, that is, to the amount of light received. When the switch 17 is opened by linkage with the first-step operation of the shutter botton, the capacitor 3 maintains its terminal voltage which it had immediately before the actuation of the shutter botton, as a stored value. Thus, while the terminals of the capacitor 3 are connected with the gate circuit of MOS-FET 4. No current flow through this gate circuit, so that the voltage stored by the capacitor 3 is accurately maintained. The use of a log-diode having a logarithmic characteristics in the photometric circuit permits an efficient memory over a broad extent of the amount of incident light. The MOS-FET 4 and 5 form a differential amplifier circuit as shown, and in the gate circuit of the MOS-FET 5 is also connected to a log-diode 6 having the same characteristics as the log-diode 2 in the photometric circuit. The circuit including the transistors 7 and 8 acts to control the current $I_2$ which flows to the diode 6 so that $I_1 = I_2$. Thus the terminal voltage $E_2$ of the log-diode 6 becomes equal to the voltage $E_1$ across the log-diode 2 in the photometric circuit, which is in turn equal to the voltage stored by the memory capacitor 3. The circuit reaches an equillibrium under this condition, with the emitter-collector current $I_2$ of the transistor 8 being equal to the current $I_1$ flowing through the photo-conductor 1 of the photometric circuit. In other words, the resistance across the emitter and collector of the transistor 8 becomes equal to the resistance of the photo-conductor 1. In this embodiment of the present invention, the output circuit of the transistor 8 is not directly used for the shutter speed controlling circuit, but another transistor 9 is provided which operates in the identical manner as the transistor 8 and the emitter-collector resistance of which is used in the shutter speed controlling timer circuit. Thus the capacitor 10 in the time constant circuit for controlling the shutter speed is arranged to be charged through the output circuit across the emitter and collector of the transistor 9, with the resulting time delay being used to determine the shutter speed. By the second-step operation of the shutter botton, the switch 19 is opened and at the same time the shutter starts to open. After the tine delay determined by the above time constant circuit, the retention by the electromagnet 15 of the shutter closing means is released, whereby a proper shutter speed can be obtained. The transistor 11 consititutes a constant current circuit together with the temperature compensation diode 13, and the diode 12 acts to provide an increased range for operation of the transistors 8 and 9 so that thet may be responsive to a variation of light amount over a broad extent.

Figure 2:
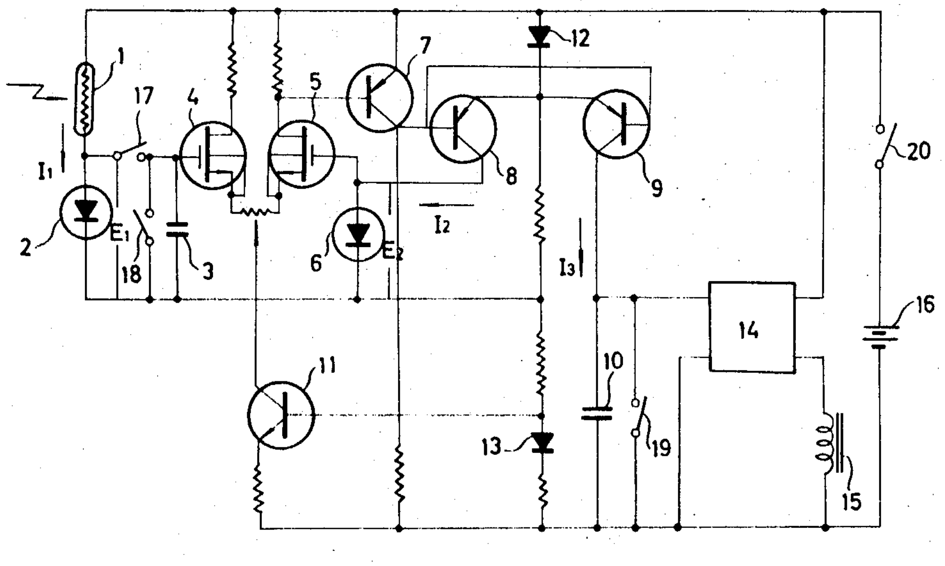
FIG. 2 is a circuit diagram showing one embodiment of the electrical exposure control device according to the present invention.
Figure 3:
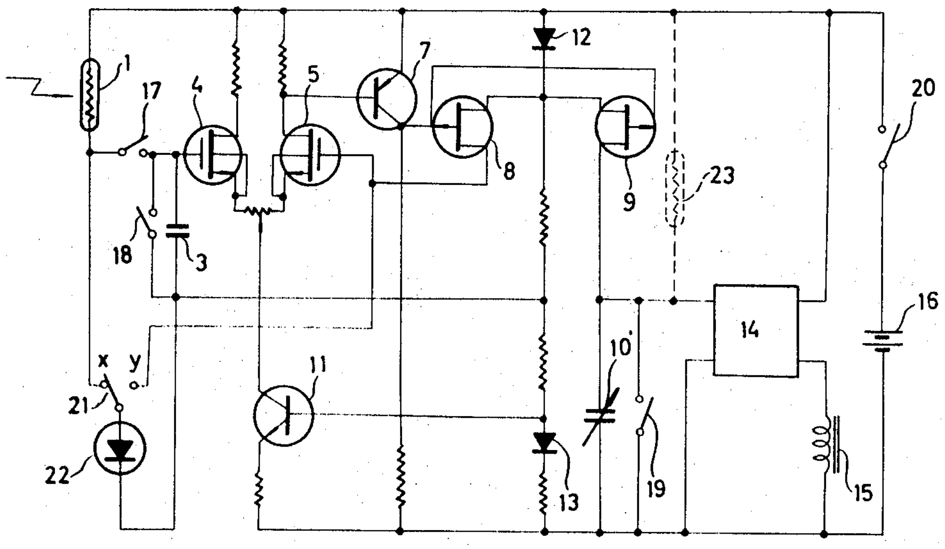
FIGS. 3 and 4 are similar circuit diagrams showing another embodiment of the present invention.

The main feature of the embodiment shown in FIG. 2 is that the photo-sensitive current $I_1$ across the photo-conductor 1 is passed through the log-diode 2 to compress stored voltage across the memory capacitor 3 and the current $I_2$ responsive to the current $I_1$ is regenerated in the regenerator circuit by means of the feed-back connection. As a result, the trigger circuit including the capacitor 10 and the electromagnet 15 remains essentially the same as that used in the conventional timing circuit of the external photometry type, and therefore may be directly used with external photometry by connecting another external photometric device, a photo-conductor of CdS 23, for example, and switching over to the current therefrom as $I_2$. Alternatively, the manufacturing of the control circuit can be divided into two steps, fabrication of the memory circuit unit of the present invention and fabrication of a conventional shutter timing circuit unit, so that the shutter timing circuit unit may include the photo-conductor 23 shown in FIG. 3 to function as a shutter circuit of the conventional type or may be connected with the memory circuit unit to function as an electric shutter control circuit with a memory. In order to have a shutter speed which corresponds to film sensitivity or the like, known means may be employed without change such as varying the reference voltage of the trigger circuit, varying the capacitance of the variable capacitor 10' constitutes the like. they Next, FIG. 3, shows a circuit diagram for another embodiment of the electrical shutter device according to the present invention. The circuit arrangement is substantially similar to that of FIG. 1 except that in this embodiment, a single diode acts both as the log-diode in the photometric circuit and the log-diode in the regeneration circuit, the switching between these functions being effected by a switch 21. When the log-diode in the photometric circuit (2 of FIG. 2) has a characteristics which is different from that of the log-diode in the regenerator circuit (6 of FIG. 2), this leads to an error. However, in the present circuit, a single log-diode 22 is used for these purposes by change-over of the switch 21, so that the error is eliminated. Thus, before actuating the shutter botton, the switch 21 is connected with a terminal X, and upon termination of the charging of the memory capacitor, the switch 21 is changed over to a terminal Y, thereby utilizing the log-diode 22, which is then useless for photometry, directly in the regenerator circuit. In addition, the present circuit is arranged so that the diaphragm aperture or the film sensitivity is set by changing the capacitor 10' (10 of FIG. 2) in the time constant circuit. Further operation is substantially similar to FIG. 2 and therefore will not be described.

As mentioned above, in the electric exposure control device shown in FIGS. 2 and 3, the amount of light measured by the photometric circuit is compressed by the compressive characteristics of the log-diode and stored across the memory capacitor which is connected with the field effect transistor having a high input impedance. Thus even if the incident light upon the photo-conductor is interrupted as by bouncing up of a reflector mirror in a single lens reflex camera of TTL type, said amount can be stored as a voltage value. By means of the feedback circuit which incorporates the differential amplifier, the voltage value can be regenerated to obtain a resistance across the emitter and collector of a transistor which is equal to the resistance of said photo-conductor. By using this resistance to control the shutter speed, an arrangement for an electrical shutter having an extremely high accuracy and capable of operation over a broad range can be provided, which is extremely effective as an electrical shutter for a single lens reflex camera of TTL type.

Figure 4:
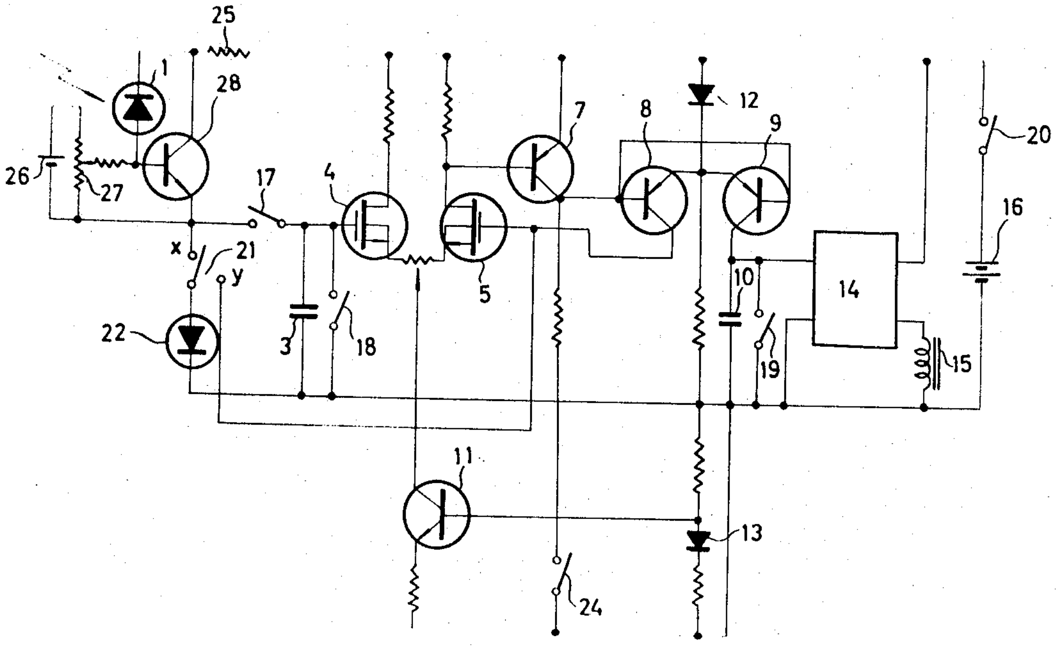

The embodiment shown in FIG. 4 is same as the embodiment shown in FIGS. 2 and 3 except that a switch 24 is provided at the collector side of the transistor 7, a resistor 25 a battery 26, a potentiometer 27 and a transistor 28 are provided in the photometric circuit, as in this case the photosensitive element 1 is a photodiode. The base potential of the transistor 28 is variable. The photo-diode may be arranged in various modified manners.

As shown in FIG. 5 (a) a photo-conductor has a nonlinear characteristics and therefore in this embodiment a photo-diode is used instead of the photo-conductor. The photo-diode has a linear characteristics over an extremely wide range as shown in FIG. 5 (c), and also a log-diode has a linear characteristics over a extremely wide range as shown in FIG. 5 (b). As the photo-diode and the log-diode have a similar range of linear characteristics, the embodiment assures accuracy in a wider range as compared with the embodiment shown in FIGS. 2 and 3.

The embodiment shown in FIG. 6 is the same as the embodiment shown in FIGS. 2 and 3 except that a variable resistor 30 is provided at the emitter side of the transistor 11 in the differential amplifier circuit and a resistor 29 and a diodes 13' are provided at the base side of the transistor 11. Also a thermistor 32 is provided at the drain side of a field effect transistor 5 and a feed-back resistor 33 is provided at the emitter side of the transistor 7. Moreover a secondary switch 31 is provided for the regenerator circuit and for the controller circuit, and the controller circuit is composed of a field effect transistor 141, a transistor 142, both constituting a Schmitt trigger circuit, and an inverter transistor 143 of a polarity opposite to that of the transistor;8c 142. Thereby, the voltage supplied to the photometric circuit is easily increased. 16

The thermister 32 and the feed-back resistor 33 with aid of the constant current source for the differential amplifier circuit, effectively eliminate the thermal dependency and supplied voltage dependency as shown respectively in FIG. 7 and FIG. 8.

The secondary switch 31, reduces power consumption particulary in case of a long exposure time, The variable resistor 30 with aid of the resistor 29 the diodes 13', and the transistor 11 permits stabilized setting of photographic information such as a diaphragm value as shown in FIG. 9. The variable resistor 30 preferably exhibits the characteristics shown in FIG. 9.

In the embodiments shown in FIGS. 10, 11 and 12, an ammeter 34 or a voltage meter 35 is provided as an exposure indicator, particularly in FIG. 11 and FIG. 12 the ammeter 34 is provided in the output circuit of the field-effect transistor 4 (FIG. 11) 36 (FIG. 12) responsive to the output of the photometric circuit.

In the above embodiments, a shutter speed may be previewed and postviewed through a window suitably provided through a finder as shown in FIG. 13. And warnings such as against over-exposure, underexposure or slow shutter speed causing blurred pictures are given so that the operator can enjoy an easy operation.

In FIG. 14 a variable resistor 37 or 38 and a changover switch 39 or 39' changes the exposure control device from an automatic control E or E' to a manual control M or M'. The variable resistor 37 is provided in a parallel manner with the photo-sensitive element 1, while the variable resistor 38 is provided in a parallel manner with the output circuit of the regenerator circuit. According to the above embodiment, a photograph can be taken at a desirable shutter speed by a manual operation as well as by an automatic operation.

The embodiment shown in FIG. 15 comprises a main switch 40 for activation of the device in association with the camera release operation, and a switch 41 for self-holding of the main switch 40 in association with a secondary switch 42 which is self-held by the output through the electro-magnet 15 of the controller circuit.

The modified embodiment shown in FIG. 16 comprises a main switch 43 a secondary switch 44, a stabilizer diode 45 and a switching diode 46 which prevents power flow to the regenerator circuit R and the controller circuit C through the main switch 43, but permits power to be supplied to the photometric circuit P and the differential amplifier circuit A through the secondary switch 44.

The last embodiment shown in FIG. 16 is particularly preferable for a high-speed shutter with a reasonable accuracy. As the secondary switch is self-held, even if the main switch is opened, the operator is not required to hold the shutter button down to close the main switch.

In the embodiment shown in FIG. 17, member L is a taking lens, 47 is a transistor, 48 is a variable transmittance element, 49 is a beam splitter, 50 is a photoconductor, 51 is another variable transmittance element, 52 is a power source whose voltage is adjustable, 53 is a photoconductor, 54 is a capacitor. The photoconductor and the capacitor 54 constitutes a regenerated timer circuit.

In the embodiment, the photometric circuit gives the differential amplifier circuit an output responsive to the light incident to the photosensitive element 1 and the regenerator assembly comprises the transistor 47 the variable transmittance element 48, the beam splitter 49, the photoconductor 50, the variable transmittance element 51, the variable power source 52 and the photoconductor 53.

The variable transmittance elements 48 and 51, may be composed of various elements such as of a liquid crystal of the field effect type or a chemical element. One example of a chemical element used as the variable transmittance element will be described in reference to FIG. 18.

FIG. 18 shows a cross-section of the variable transmittance element in which the transmittance for light depends on the thickness of electrolytic deposition of metal.

Member 55 is a transparent glass case, 56 is a transparent electrode, 57 is a grid electrode permitting light to pass through, 58 is an electrolyte of metal salt, and 59 and 60 are terminals for the electrodes 56 and 67 respectively. The metal deposition on the transparent electrode 56 is effected in response to the applied voltage between the terminals 59 and 60. Therefore, the element 48 and 51 acts as a variable transmittance element to the light passing therethrough.

The variable transmittance element 48 receives the light directly from an object and the transmitted light through the element 48 is split by the beam splitter 49 into the light directing in A direction and the light directing in B direction. The former light falls upon the photoconductor 50 and the current through the photoconductor 50 is made equal to the current passing through the photo-conductor 1, because the element 48 is connected to the collector of the transistor 47 and the light from outside falls on the photoconductor 50 through the element 48 as the photoconductor 50 is connected with the gate of the field effect transistor 5. Particularly in the embodiment shown in FIG. 7, the diode 22 is changed over by the switch 21 and the capacitor 3 memorizes the intensity of the light passing through the lens by the switch 17. Whenever the reflex mirror is held bouncing up, the transmittance factor of th element 48 is held to a value responsive to the memorized voltage across the capacitor 3.

Thus the illumination on the photoconductor 1 is regenerated. The transmittance factor of the variable transmittance element 51 is adjusted in response to the photographic information such as a diaphragm value so that the resistance value of the photoconductor 53 in the timer circuit responds directly to the shutter speed.

FIG. 19 shows a modification in which the construction of the regenerator circuit is simplified. As compared with the embociment shown in FIG. 3, a transistor 9 equivalent to the transistor 8 is omitted in FIG. 19. For utilizing the transistor 8 as the transistor 9, a retainer capacitor 99 and a switch 98 are provided.

In FIG. 21, members 61, 61', 62 and 66 are variable resistors constituting a bridge circuit. The photoconductor 1 is provided in parallel with the resistor 61. The connecting points G and H are given the output of the bridge circuit. 64 and 65 are field effect transistors constituting the differential amplifier circuit. Member 67 is an invertor transistor, 68 is a feed-back transistor for regeneration, 69 and 73 are transistors equivalent to the transistor 68 and 70 is a timer capacitor. The output circuit of the transistor 69 and the capacitor 70 constitute a time constant circuit with a secondary switch 72. Member 71 is a main switch for the bridge circuit, the differential amplifier circuit, the regenerator circuit and the controller circuit without the time constant circuit. Member 74 is a checker switch usually connected with the transistor 73. Part 75 is an ammeter which also functions as an indicator for battery checking when the checker switch 74 is connected to the checker circuit. In this embodiment the combined circuit of the photo-resistor 1 and the variable resistor 61 works as a compressor. Some of the variable resistors 61, 61', 62 and 66 and variable resistors in the differential amplifier circuit are used as adjuster elements for the photographing information and others may be used as adjusting or compensating elements for the device. The indicator 75 shows shutter speeds as the transistor 73 is positioned behind the adjuster element. Whenever the main switch is closed, the ammeter indicates the shutter speed.

A modified embodiment shown in FIG. 21 has a similar relation to the embodiment in FIG. 20 as the embodiment in FIG. 3 has to the embodiment in FIG. 2. The variable resistors 61 and 76 in FIG. 21 serve as the variable resistors 61 and 62 in Fig. member 20 respectively as well as the variable resistor 61' and 66 respectively in FIG. 20. Switches 77 and 78 are changed for the above purpose.

FIG. 22 shows an embodiment with improvement in the range for setting a photographic information. In FIG. 22, elements 79, 80 are log-diodes only for shutter speed indication, the element 81 is a transistor for indication, 82 is an ammeter for the indication, 83 and 84 are switches and 85 and 86 potentiometer for setting the photographing informations. The potentiometers 85 and 86 are associated with each other and adjusted. The switch 21 and the switch 84 are associated with each other and changed over. In the state as shown, when the switches 20 and 17 are closed, an output is regenerated only for actuation of the ammeter 82. Then even when the switch 17 is opened, also an output is regenerated only for actuation of the ammeter 82. Thereafter the switches 21 and 84 are changed over respectively from a terminal X and a terminal K to a terminal Y and a terminal Z so that the diode 79 in the regenerator circuit is replaced 171 79 by the diode 22 both for the photometry and the regeneration. The start switch 19 and the switch 83 are associated with each other. When the switch 19 is opened, the switch 83 is connected a terminal 8' to control the switching circuit 14 while when the switch 19 is closed, the switch 83 is connected to a terminal K'. In other words, the transistor 9 actuates the switching circuit and the ammeter in a time-sharing manner. As only the single diode 22 serves for exposure control accuracy in the shutter speed is assured.

In FIG. 23, the full line shows an improved characteristics obtained by the above embodiment in FIG. 22; the shutter speed is shown along the abscissa and the resistance value of the photoconductor 1 is shown along the ordinate. The associated adjustment of the potentiometers 85 and 86 also works as a compensator to the characteristics of the device. Without this associated adjustment, the characteristics is as shown by the dotted line the gradient of which deviate from an imaginary chained line. The linked potentiometers 85 and 86 thus widen the range of setting the photographing informations with high accuracy.

The embodiment shown FIGS. 24 and 25 show an electric exposure control device comprising a photometric circuit having a photosensitive element 1 and a transistor 91, a differential amplifier circuit with transistors 4 and 5, a regenerator circuit and a controller circuit in which the photometric circuit gives the differential amplifier an output responsive to the light incident to the photo-sensitive element 1 and the regenerator circuit receives an output from the differential amplifier circuit and gives both the controller circuit and the photometric circuittransistor 91 its output responsive to the output received from the differential amplifier circuit. The photometric circuit-transistor 91 is used as an element of the regenerator circuit. A switch 92 (in FIG. 24), 92' (in FIG. 25) switches the transistor 91 from the photometric circuit to the regenerator circuit.

Particularly in FIG. 24, the output terminals of the differential amplifier circuit and the input terminals of the regenerator circuit have a memory switch 17' and a memory capacitor 3' connected between th . Element 87 is a load resistor of the differential amplifier circuit. The variable resistors 88 and 89 for giving a reference voltage to the differential amplifier circuit constitute a bleeder circuit, and variable resistors 88 and 89 are used for setting a photographing information. Element 90 is a field effect transistor of high input impedance, and 93 is an ammeter both for exposure indication and battery checking. A switch 94 is a switch for the ammeter 93. When the switch 94 is connected with a terminal C the ammeter indicates the shutter speed, while the switch 94 is connected with a terminal *d* the ammeter 93 shows a supplied voltage of the battery 16.

Particularly in FIG. 25 a memory switch 17 and a memory capacitor 3 are provided between the output terminals of the photometric circuit and the input terminals of the differential amplifier circuit. In this case the transistors 4 and 5 have high input impedances. Element 87' is a load resistor of the differential amplifier circuit. Member 95 is a switch both for the controller circuit (terminal *c'*) and for the ammeter 93 (terminal d'). Component 96 is a checker switch, 87 is a transistor constituting a regenerator circuit together with the transistor 91. In this case, when the switch 92 contacts a terminal *x'* and the switch 17 is closed, the output impedance of the transistor 91 is responsive to the resistance of the photoconductor 1. When the switch 17 is opened in association with the mirror-up, the transistor 91 is retained in a responsive state to the memorized voltage across the capacitor 3. When the switch 92' is changed over to contact with a terminal Y' and the switch 95 contacts with a terminal *d'*, an ammeter 93 indicates a shutter speed. When the switch 95 contacts the terminal *c'*, the output circuit of the transistor 95 and the timer capacitor 10 constitute a regenerated time constant circuit.

According to the embodiments shown in FIGS. 24 and 25, the shutter speed can be always viewed at any desirable time.

FIG. 26 is a graph showing the resistance value ($R_1$ in Ω) of the photoconductor on the abscissa in response to the illumination on the ordinate in two cases: (a) where the light enters into the photoconductor 1 without passing through a filter while (b) where the light enters into the photoconductor through a filter positioned before the photoconductor.

As seen from the graph the resistance values of the photoconductor varies with a strictly linear characteristics in an illumination range from 0.01 lux to 3 lux.

When the illumination is beyond 3 lux that is when **the resistance value $R_1$ is less than $R_o$ 5 the characteristics deviates from the straight line. In order to avoid such deviation, at a high illumination a filter is provided before the photoconductor 1. In this case as shown by the hatched portion (*b*) the high illumination light after passing through the filter assures an extremely linear characteristics. In this way the range of photometry is widened without sacrifying the linearity of the photoconductor characteristics.**

FIG. 27 shows an embodiment in which the photometric range is wided while the strict linearity of the photoconductor characteristics is assured.

The embodiment shown in FIG. 27 comprises two interchangeable variable capacitors 110 and 110', a filter 100, a filter mounting and dismounting means 104 for changing the sensitivity of the photometric circuit P with a photoconductor 1.

The interchange of the variable capacitors 110 and 110' and the filter mounting and dismounting are simultaneously effected by a linked mechanism 105. So as to widen the exposure range. Component 101 is an interchange switch which contacts with a terminal h when the filter 100 is mounted before the photoconductor 1 and contacts with a terminal *l* when the filter is dismounted out of the light pass.

FIG. 28 shows an automatic change over device applicable to the embodiment shown in FIG. 27 in which a secondary photo-sensitive element is provided for effecting an automatical interchange of the variable capacitors 110 and 110' and an automatic change over of the filter 100. In this automatic change over device, there are provided a secondary photoconductor 102, an electro-magnet 103, a change-over means 106, a change-over switch 107 and a linked mechanism 108. Part 114 is a switching circuit such as a Schmitt circuit, 116 is a power source for the automatic change over device.

When dark, the potential of a point W becomes high and the electro-magnet 103 moves and retains the change over means 106 and the change-over switch 107 at a side $h_1$ and a side *h'* respectively in an associated manner. Thus the change-over means 106 dismounts the filter 100 through a suitable linkage.

When too bright, the potential at the point w becomes low and the electromagnet 103 liberates the change-over means 106 so that the change-over means 106 and the change-over switch 107 return to a side $l_1$ and a side *l'* respectively by a spring (not shown).

Thus, the filter is mounted and the capacitor 110' with a low capacitance is selectively used. As the change-over switch 107 changes the inversion voltage of the switching circuit 114, an accurate automatic change-over for the exposure control device is assured.

An embodiment shown in FIG. 29 is an exposure control device comprising a photometric circuit having a first a photo-sensitive element 1 receiving the light through a taking lens, an amplifier circuit A, a regenerator circuit R and I, a controller circuit 14 such as a Schmitt circuit, a second photo-sensitive element 23 receiving the light not through the taking lens but through a window. The element 23 is in parallel with the regenerator circuit. A third photo-sensitive element 109 actuates either one of the circuit, with the first photo-sensitive element 1 or the circuit with the second photo-sensitive element 23. An indicator lamp 118 serves for indicating the actuation of the circuit with the first photo-sensitive element 1 and another indicator lamp 117 for indicating the actuation of the circuit with the second photo-sensitive element 23. Component 115 is a main switch, 116 is a power source, 119 and 120 are resistors, 121 to 124 are transistors working complimentarily.

What is claimed is:

1. An electric exposure control device characterized by a photometric circuit including a photoelectric element and a first log-diode, a capacitor for storing the terminal voltage of the first log-diode, a differential amplifier, and a regenerator circuit comprising a transistor which operates in response to the output of the differential amplifier and including a second log-diode connected to the transistor said differential amplifier comparing the terminal voltage of said capacitor with the terminal voltage of the second log-diode of the regenerator circuit so that the current which flows to the transistor in the regenerator circuit becomes responsive to a current in the photometric circuit, a transistor having an output resistance which is equal to the output resistance of the transistor in the regenerator circuit being used as a resistor element of a time constant circuit which controls the shutter speed.

2. An electric exposure control device according to claim 1, characterized in that a switch alternately connects a single diode which serves as both the log-diode in the photometric circuit and the log-diode in the regenerator circuit.

3. An electric exposure control device, comprising a photometric circuit having photosensitive means and a storage capacitor connectable to said photosensitive means for charging to a level indicative of the brightness sensed by said photosensitive means when connected to said photosensitive means, comparator means including a comparator circuit, said comparator circuit having an input connected with said capacitor and an output, said comparator means including a regenerator circuit connected to the output of said comparator circuit and connected with the other input of said comparator circuit to form an electrical feedback circuit, a timing circuit responsive to said comparator means and having a timing capacitor, a switching circuit having an input connected to and responsive to the timing capacitor for producing a signal controlling the duration during which a camera shutter is open, signal compression means for logarithmically compressing signals applied thereto, and circuit means for coupling said compression means to said capacitor when said capacitor is connected to said photosensitive means and for coupling said compression means to said other input at other times.

4. A device as in claim 3, wherein said timing circuit is responsive to said regenerator circuit.

5. A device as in claim 4, wherein said comparator circuit includes a pair of field effect transistors.

6. An electric exposure control device, comprising a photometric circuit having a photosensitive element and a logarithmic compression element connected to said photosensitive element for compressing voltages applied thereto, a differential amplifier circuit having a differential input connected to said compression element and being responsive to the voltage across said compression element, a regenerator circuit responsive to an output signal for said amplifier circuit, a controller circuit for controlling the exposure, and a network connecting the regenerator circuit to both the amplifier circuit and the controller circuit so as to deliver an output signal from the regenerator circuit to both the amplifier circuit and the controller circuit, whereby the output from the regenerator circuit is responsive to the output from the amplifier circuit, said regenerator circuit including a second logarithmic compression element, said amplifier circuit including a second differential input, said second compression element being connected to said second differential input for applying a compressed signal to said second differential input.

7. A device as in claim 6, further comprising a variable resistor, said regenerator circuit having an output circuit, and switch means for switching said variable resistor across said output circuit.

8. An electric exposure control device according to claim 6 which further comprises a memory capacitor and a memory switch between the photometric circuit and the differential amplifier circuit.

9. An electric exposure control device according to claim 6 in which said first element is a diode and said diode applies the compressed input to the differential amplifier circuit when the memory switch couples the photometric circuit with the memory capacitor.

10. An electric exposure control device according to claim 6 in which the regenerator circuit is composed of at least two transistors one of which is used for controlling the differential amplifier, and another of which is used for controlling the controller circuit.

11. An electric exposure control device according to claim 10 in which the controller circuit has a timer capacitor and a timer switch and controls the exposure time.

12. An electric exposure control device according to claim 11 in which the controller circuit comprises a Schmitt circuit with a field-effect transistor as its input-stage transistor.

13. An electric exposure control device according to claim 11 which further comprises a photo-sensitive element connected in parallel wih the output circuit of the regenerator circuit.

14. An electric exposure control device according to claim 11 in which the differential amplifier circuit has a first potentiometer and the regenerator circuit has a second potentiometer, said first and second potentiometers are each set to to a given input value of.

15. An electric exposure control device according to claim 6 in which the output circuit of the differential amplifier circuit comprises compensator means for voltage changes due to thermal variation.

16. An electric exposure control device according to claim 6 which further comprises a main switch for power supply to the photometric circuit, and the differential amplifier circuit, and a secondary switch for power supply to the regenerator circuit and the controller circuit.

17. An electric exposure control device according to claim 16 in which the main switch is closed in association with camera release operation and the secondary switch is self-held by the output of the controller circuit.

18. An electric exposure control device according to claim 17 in which the main switch is composed of two switches: one for activation of the device in association with camera release operation and the other for self-holding of the main switch in association with the secondary switch.

19. An electric exposure control device according to claim 16 which further comprises a diode which prohibits power supply to the regenerator circuit and the controller circuit through the main switch, but permitts power supply to the photometric circuit and the differential amplifier circuit through the secondary switch.

20. An electric exposure control device according to claim 6 which further comprises an ammeter as an indicator.

21. An electric exposure control device according to claim 6 wherein the controller circuit comprises at least two interchangeable varible elements, means for changing over the sensitivity of the photometric circuit is provided, and the interchange of said variable elements and the change-over of the sensitivity are simultaneously effected so as to widen the exposure range.

22. An electric exposure control device according to claim 21 wherein the variable elements are timer capacitors and the change-over means is a filter.

23. An electric exposure control device according to claim 21, which further comprises a secondary photosensitive means for automatically effecting the interchange and the change-over.

24. An automatic exposure control apparatus, comprising:

photosensitive means for producing a variable electrical output in response to the brightness of light incident thereon;

memory means for storing electrical values;

switching means for coupling said photosensitive means at predetermined times and storing in said memory means a value determined at least partially by said photosensitive means;

electrical comparison means having an output and having a first input coupled to said memory means and responsive to the value stored in said memory means, said electrical comparison means having a second input for producing an error signal at the output when the relationships between the inputs vary from each other;

regenerative means coupling the output of said comparison means to the second input;

shutter control means responsive to said switching means and coupled to the output for controlling a shutter on the basis of the output;

compression means for logarithmically compressing electrical signals applied thereto;

and circuit means for coupling said compression means to said memory means when the switching means couples said photosensitive means to said memory means so that the value stored in said memory means is modified by said compression means and for coupling said compression means to said second input of said comparison means so as to modify the value applied by said regenerative means to said second input.

25. An apparatus as in claim 24, wherein:

said compression means modifies the values at the second input in the same way as said compression means modifies the values across said memory means so that the error signal tends to drive the value at said second input to the value across said memory means and so that the output corresponds in value to signals applied to said memory means by said photosensitive means.

26. An apparatus as in claim 25, wherein said shutter control means includes:

capacitive means;

variable resistance means coupled to said capacitive means and coupled to the output of said comparison means so that its resistance varies in response to the output of said comparison means, said variable resistance means applying a voltage across said capacitive means; and trigger means coupled to said capacitive means and responsive to the voltage across said capacitive means for triggering when the voltage reaches a predetermined value.

27. An apparatus as in claim 24, wherein said shutter control means includes:

capacitive means;

variable resistance means coupled to said capacitive means and coupled to the output of said comparison means so that its resistance varies in response to the output of said comparison means, said variable resistance means applying a voltage across said capacitive means; and trigger means coupled to said capacitive means and responsive to the voltage across said capacitive means for triggering when the voltage reaches a predetermined value.

28. An automatic photoelectric exposure control device for a camera having an electronic shutter whose exposure time is controlled in accordance with the light intensity of the object to be photographed, comprising:

a measuring circuit including photosensitive means arranged to receive light passing through a camera lens;

a memory circuit including a capacitor for memorizing a value indicative of the light of said photosensitive means;

a switch connecting and disconnecting the measuring circuit from said memory circuit;

a differential amplifier having two differential inputs, one of said inputs being connected to said capacitor, said amplifier having an output;

a regenerator circuit coupling the output to the other input of said differential amplifier circuit and having variable resistance means responsive to the output of said differential amplifier circuit;

a shutter controlling circuit for controlling a shutter time, comprising a timing capacitor connected to said variable resistance means, and a switching circuit having an input connected to the capacitor, said capacitor having a voltage determined by said variable resistive means, said switching circuit defining the shutter opening interval on the basis of the voltage across said timing capacitor reaching a threshhold level so as to close the shutter;

compression means for logarithmetically compressing electrical signals applied thereto; and circuit means for coupling said compression means to said memory circuit when said switch connects the measuring circuit with said memory circuit so as to modify the value memorized from the output of said photosensitive means, and for connecting said compression means to said other input of said differential amplifier and said regenerator circuit so as to modify the signal applied by said regenerator circuit to the other input.

29. A device as in claim 28, wherein:

said compression means includes a first compression element connected to said photosensitive means and a second compression element connected to the other input of said differential amplifier.

30. An apparatus as in claim 28, wherein said compression element includes:

a compression element; and said circuit means includes switch means for switching said compression element into connection with said photosensitive means when said measuring means is connected to said memory means and for switching said compression elements into connection with the other input of said differential amplifier.

31. A device as in claim 28, wherein:

said differential amplifier includes two field effect transistors, each gate of one of said transistors forming one of said two inputs.

32. A device as in claim 28, wherein:

said regenerator circuit includes a first transistor whose base electrode is connected to the output of said differential amplifier and having an output electrode, a second transistor whose base electrode is connected to the output electrode of said first transistor and whose output electrode is connected to the other input of said differential amplifier;

said variable resistance means in said regenerator circuit including a third transistor having a base electrode connected to the output of said differential amplifier and an outut electrode connected to said timing capacitor.

33. A device as in claim 28, wherein:

said regenerator circuit includes two transistors and a switchover switch;

one of said transistors including a base electrode connected with the output of said differential amplifier and an output electrode connected to the base electrode of the other transistor, said other transistor forming a part of said variable resistance means;

said second transistor having an output electrode connected to said timing capacitor through said switchover switch;

said switchover switch alternately and selectively connecting the output electrode with the input of said differential amplifier and said timing capacitor.

* * * * *